March 13, 1951  C. J. CLAUDE  2,545,226
LEAF SCOOP
Filed May 20, 1946

Inventor
Charles J. Claude
By Robert M. Dunning
Attorney

UNITED STATES PATENT OFFICE 2,545,226

LEAF SCOOP

Charles J. Claude, St. Paul, Minn.

Application May 20, 1946, Serial No. 670,881

6 Claims. (Cl. 294—55)

My invention relates to an improvement in leaf scoop wherein it is desired to provide an apparatus capable of picking up leaves from the grass.

Various types of devices have been used for picking up leaves and similar material from lawns. Most of these devices are either quite complicated in construction and costly to purchase or else are relatively inexpensive, but not particularly effective in operation. Various types of leaf collecting devices employing rotatable reels have been used for the purpose. Such devices, however, are relatively expensive to purchase and maintain. While the usual lawn rakes are inexpensive to purchase they are somewhat difficult to use when the leaves are plentiful.

It is the object of the present invention to provide a scoop which may be pushed over the surface of the ground much in the manner of a snow shovel and which will effectively pick up leaves from the surface of the grass. These leaves slide onto the body of the scoop and may be carried to a central pile or disposal receptacle.

A feature of the present invention resides in the provision of a scoop having a bottom and three connected sides and an open front. Leaves are guided through this open front into the receptacle permitting a large number of leaves to be carried.

A feature of the present invention resides in the provision of a leaf scoop having a relatively large body formed of extremely light weight material so that the scoop is easy to handle. The body of the scoop may be formed of screen or similar material which is of light weight and yet which is capable of supporting the leaves.

A feature of the present invention resides in the provision of a leaf scoop having at its forward edge a transverse bar designed to travel along the surface of the earth. This bar is shaped in such a manner as to bend down grass beneath the leaves to permit the leaves to be guided into the body of the scoop.

A further feature of the present invention resides in the provision of a leaf scoop having a transverse bar extending along its forward edge which is provided with a series of alternate ground engaging portions and slots. This construction limits the contacting area of the bar with the ground, and is more effective in guiding leaves into the scoop than is a bar of equal cross section throughout its length.

A further feature of the present invention lies in the provision of a simple scoop employing a transverse guide bar, a handle extending rearwardly therefrom, and a light weight scoop body overlying the handle rearwardly of the guide bar and being supported thereby.

These and other objects and novel features of my invention will be more clearly and fully set forth in the following specification and claims.

In the drawings forming a part of my specification:

Figure 1:
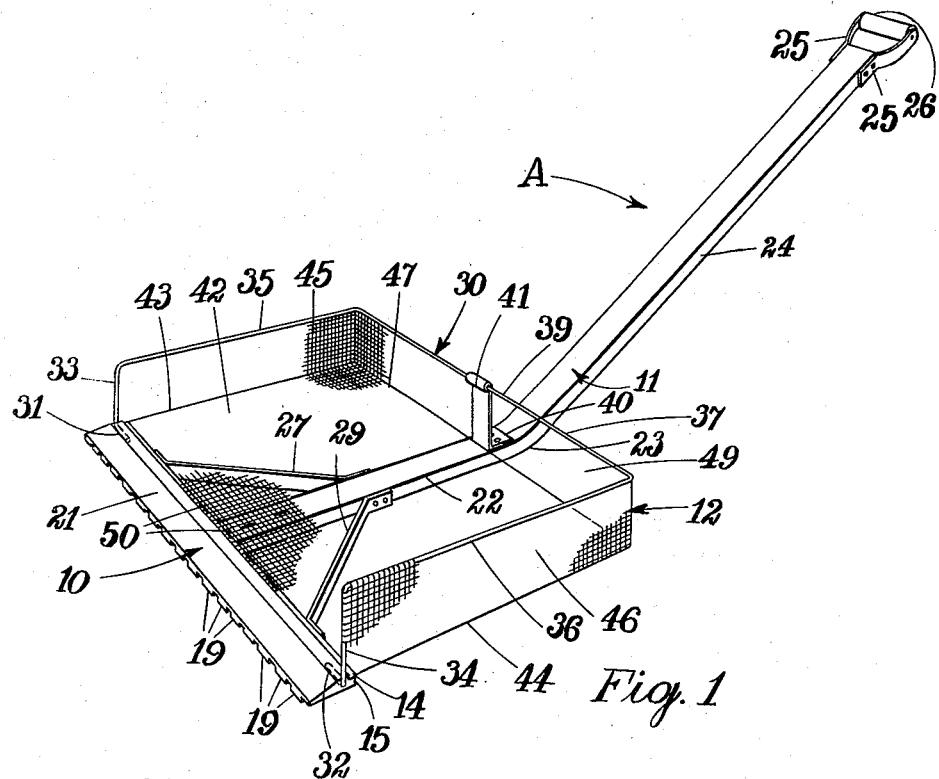
Figure 1 is a perspective view of my leaf scoop showing the construction thereof.

The leaf scoop A is constructed as best illustrated in Figure 1 of the drawings. In general the scoop A includes a transverse guide bar 10, a handle 11 secured to the bar 10 to extend rearwardly therefrom, and a scoop body 12 rearwardly of the guide bar and supported by the handle. The general manner in which these elements are assembled is believed obvious from an examination of Figure 1.

The guide bar 10 includes an upper surface 13 having a substantially rectangular notch 14 along the rear edge thereof. The rear edge 15 of the guide bar extends substantially vertical and at substantially right angles to the upper surface 13. The undersurface 16 of the guide bar 10 includes alternate ribs and grooves. A series of spaced grooves or channels 17 are provided in the lower surface 16 so as to produce a series of spaced ground engaging sections 19 extending transversely of the bar 10 and longitudinally of the direction of movement of the scoop as a whole.

Figures 2, 3:
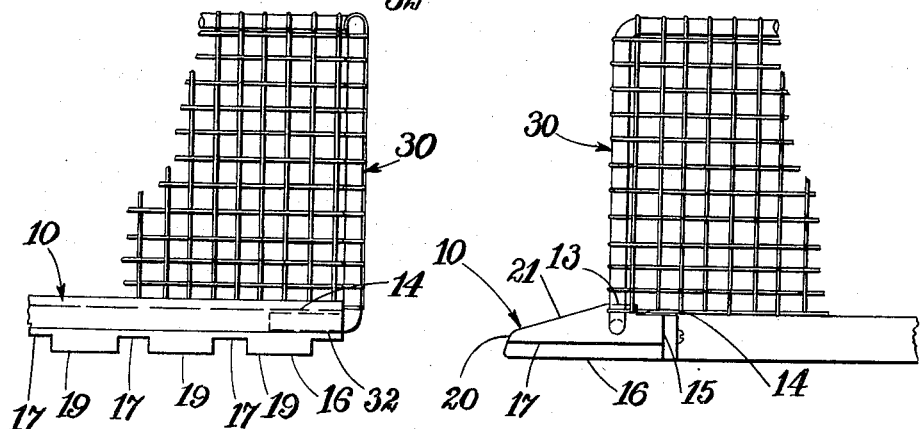
Figure 2 is a front elevational view of a portion of my leaf scoop showing the construction thereof.
Figure 3 is a side elevational view of a portion of the scoop showing the construction thereof.

The forward end 20 of the bar 10 includes upwardly and rearwardly as best illustrated in Figure 3 of the drawings, the juncture between the front edge 20 and the undersurface 16 of the projections 19 being slightly rounded. The front wall 20 extends only a portion of the thickness of the bar 10, this front wall 20 being connected by an upwardly and rearwardly inclined surface 21.

The handle 11 is preferably provided with a forward end 22 which extends substantially horizontally, the handle being bent at 23 to provide an upwardly and rearwardly inclined handle end 24. Opposed brackets 25 attached to the extremity of the handle end 24 support a cylindrical hand grip 26 by means of which the handle may be conveniently engaged with one hand.

The forward end of the handle 11 abuts against the rear surface 15 of the guide bar 10. A pair of braces 27 and 29 connect the handle portion 22 with points on the guide bar 10 spaced from the center thereof so as to brace the guide bar 10 and hold the same rigid relative to the handle. The braces 27 and 29 are secured to the handle 11 and to the bar 10 by screws, bolts or other suitable fastening means.

A frame 30 of heavy wire or the like forms a reinforcing member for the scoop body 12 and assists in maintaining this body in proper shape. The frame 30 includes a pair of opposed inwardly extending ends 31 and 32 which are anchored into the ends of bar 10 to hold the scoop body in place. The frame 30 is provided with two vertically extending frame members 33 and 34 connected to the inturned ends 31 and 32 respectively, and extending upwardly therefrom. The upper ends of the upright members 33 and 34 are bent to form parallel side members 35 and 36 respectively. These side members 35 and 36 are connected by a transversely extending frame member 37. A bracket 39 is provided with an attaching flange 40 overlying the handle 11 and secured thereto. The upper extremity of the bracket 39 engages the frame member 37 as indicated at 41 to form a support for the frame 30 intermediate its ends. Thus the frame 30 is securely attached to the bar 10 and to the handle 11.

The scoop body 12 comprises a relatively flat bottom panel 42 which is bent upwardly at its sides along fold lines 43 and 44 to form scoop body sides 45 and 46. The material forming the scoop body is also bent upwardly along the fold line 47 to form a rear wall 49 extending upwardly from the bottom panel 42 at substantially right angles. Along the upper edges of the sides 45 and 46 and the back panel 49, these panels are secured to the frame 30.

The body of the scoop forming the bottom and side walls is preferably made of screen wire or the like which is sufficiently stiff to be self-sustaining in shape and yet which is sufficiently light so as not to add considerably to the weight of the object. The edges of the side and rear panels may encircle the corresponding members of the wire frame 30 or may be secured thereto in any other way such as by soldering, spot welding or the like. The forward edges of the side walls 45 and 46 are also attached to the vertical members 33 and 34 of the frame 30 and are strengthened thereby.

The forward edge of the bottom panel 42 is secured in the notch 14 of the guide bar 10 by staples 50 or any other suitable attaching means. The groove or notch 14 permits the upper surface of the scoop body bottom panel 42 to lie coplaner with or slightly below the surface of the upper surface 13 of the bar 10.

In operation the scoop is merely pushed along the surface of the ground with the bar 10 forming the leading edge. The bar 10 appears to bend down or otherwise move the grass immediately in front of the bar 10 allowing the leaves and similar material to be guided over the bar 10 and into the body of the scoop. The bar 10 is extremely useful in extending beneath the leaves to guide them into the scoop. By using the scoop in the prescribed manner an extremely large area of lawn may be cleared of leaves in a surprisingly short period of time. The leaves as they are collected are deposited into the scoop so that they may be carried to a disposal point and dumped with little difficulty.

In accordance with the patent statutes, I have described the principles of construction and operation of my leaf scoop, and while I have endeavored to set forth the best embodiment thereof, I desire to have it understood that obvious changes may be made within the scope of the following claims, without departing from the spirit of my invention.

I claim:

1. A leaf scoop comprising a guide bar, a handle secured to said guide bar, and a leaf scoop body secured to said guide bar, said guide bar having a forwardly and downwardly inclined upper surface, and a series of grooves extending transversely of the guide bar in its bottom surface.

2. A leaf scoop comprising an elongated guide bar, a handle secured to said guide bar to extend rearwardly therefrom, a leaf scoop secured to said guide bar to receive leaves passing over the same, a series of spaced grooves in said main bar extending substantially parallel to said handle, and an upwardly and rearwardly extending forward edge on said guide bar.

3. A leaf scoop comprising a guide bar, a handle secured to said guide bar to extend rearwardly therefrom, a leaf scoop body secured to said guide bar to receive leaves passing over the same, a series of longitudinally spaced grooves in the undersurface of said guide bar, said grooves extending at substantially right angles to the forward edge of said guide bar, said forward edge extending upwardly and rearwardly, and the upper surface of said guide bar extending forwardly and downwardly.

4. A leaf scoop including a transverse guide bar having a smooth upper surface and a series of longitudinally extending spaced grooves in its undersurface, a handle secured to the rear edge of said guide bar to extend rearwardly therefrom, and a leaf scoop body secured to said handle rearwardly of said guide bar to receive leaves passing over said guide bar.

5. A leaf scoop comprising a transverse guide bar, a handle extending rearwardly therefrom and connected thereto, said guide bar having a substantially smooth upper surface and a series of spaced parallel grooves in its undersurface extending substantially parallel to said handle, and a leaf scoop body overlying said handle and secured at its forward edge to said guide bar to receive leaves passing over said guide bar.

6. The construction described in claim 5 in which the handle is bent intermediate its ends so that the forward end of the handle may extend flat below said leaf scoop body and the rear end of the handle may incline rearwardly and upwardly from the forward end thereof.

CHARLES J. CLAUDE.

REFERENCES CITED

The following references are of record in the file of this patent:

UNITED STATES PATENTS

| Number | Name | Date |
|---|---|---|
| 420,608 | Rowland | Feb. 4, 1890 |
| 592,583 | Eads | Oct. 26, 1897 |
| 1,281,483 | Bauer | Oct. 15, 1918 |
| 1,930,000 | Bulger | Oct. 10, 1933 |

FOREIGN PATENTS

| Number | Country | Date |
|---|---|---|
| 355 | Great Britain | Jan. 29, 1873 |
| 89,914 | Sweden | Aug. 10, 1937 |
| 337,384 | Great Britain | Oct. 29, 1930 |